Figure 1:
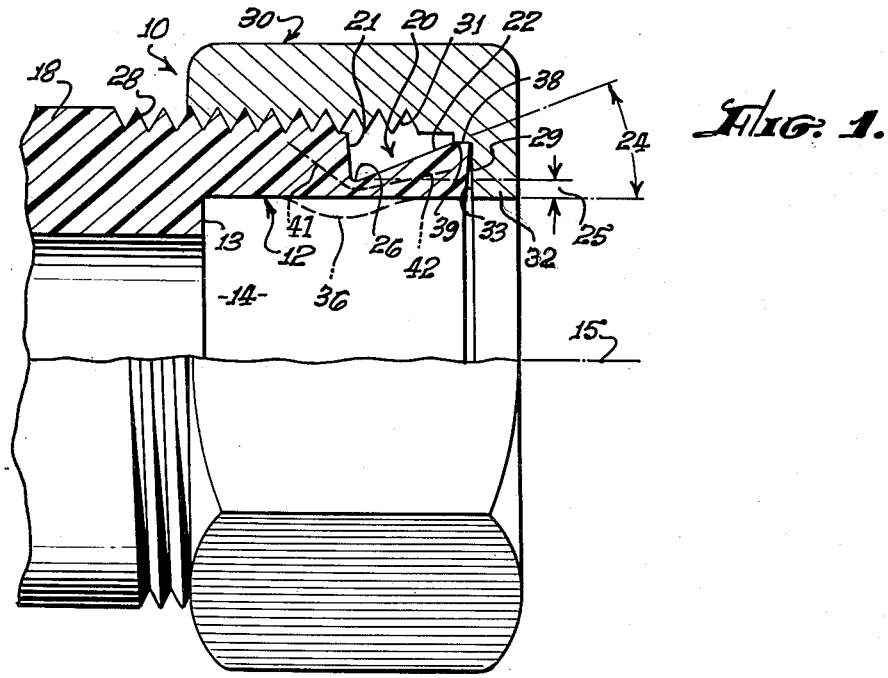

Oct. 29, 1963  J. L. MASON  3,108,827
PLASTIC FITTING FOR SUBSTANTIALLY NON-DEFORMABLE TUBES
Filed May 12, 1960

JIMMIE L. MASON,
INVENTOR.

BY Barkelew & Lewis

United States Patent Office 3,108,827
Patented Oct. 29, 1963

3,108,827
PLASTIC FITTING FOR SUBSTANTIALLY NON-DEFORMABLE TUBES
Jimmie L. Mason, San Gabriel, Calif., assignor to Mace, a corporation of California
Filed May 12, 1960, Ser. No. 28,729
2 Claims. (Cl. 285—342)

This invention provides an improved tube fitting for joining sections of tubing in fluid tight relation to each other or to other apparatus. The invention is especially useful for connecting tubes of substantially non-deformable material such as glass.

The remarkable advantages of certain solid polymerized materials for making glass tubing connectors is disclosed in the copending patent application, Serial No. 1696, filed on January 11, 1960, by Harold O. Kruger and myself under the title "Connector for Glass Tubing." The present invention relates to a novel form of tube fitting that makes particularly effective use of similar materials.

The present invention provides a sleeve formation having a definite structural form and composed of suitable deformable material, in combination with means for axially compressing the formation. In normal, uncompressed condition of the sleeve formation, its inner diameter is such as to freely receive the tube end to be connected. The sleeve form is such that axial compression creates an internal sealing flange at a point that is spaced axially inward from the sleeve end.

That is accomplished by forming the sleeve with an external circumferential channel axially inward of the sleeve end, the bottom of the channel being closely spaced from the inner sleeve surface. The sleeve compressing means may typically comprise an annular nut, threaded on the sleeve axially inward of the channel and engaging the sleeve end.

An outstanding advantage of the present structure is that the sealing action occurs at an intermediate portion of the length of the sleeve, where the sleeve surface is well protected from accidental damage. Moreover, the sealing flange is typically isolated by an appreciable thickness of the sleeve material from the mechanism that is employed to compress the sleeve. Any lack of uniformity of that compressing mechanism is therefore effectively cushioned from the actual sealing formation. The sealing pressure exerted on the tube is therefore remarkably smooth and uniform. In particular, the sealing flange is free from any unyielding restraint and can accommodate to such factors as slightly oval form of the tube.

A full understanding of the invention, and of its further objects and advantages, will be had from the following description of an illustrative manner of carrying it into effect. The particulars of that description and of the drawings which form a part of it, are intended only as illustration and not as a limitation upon the scope of the invention, which is described in the appended claims.

Figure 2:
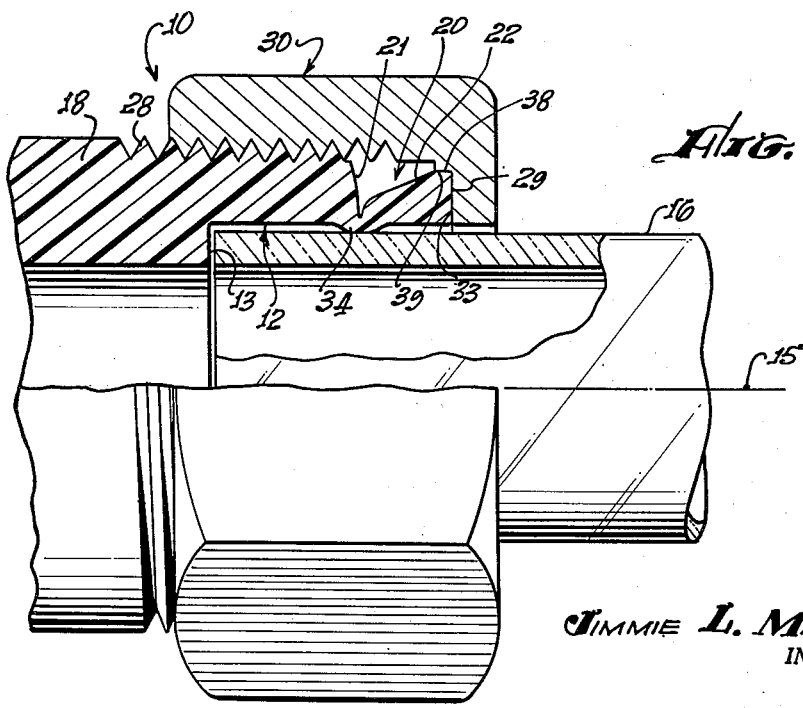

In the drawings:

FIG. 1 is an axial section representing an illustrative embodiment of the invention; and FIG. 2 is a section, showing the embodiment of FIG. 1 connected to a tube.

The drawings represent an illustrative connection element 10 in accordance with the invention, comprising a sleeve-like formation 12 having an axial bore 14. The outer end of bore 14, which is at the right as seen in the drawings, is adapted to receive the open end of a tube 16, as in FIG. 2. A shoulder 13 may be provided in bore 14 to position the tube axially. The inner end of sleeve 12 comprises a base portion 18, by which it is typically joined to one or more additional connection elements with their respective bores mutually communicating to form a tube coupling. A wide variety of such fittings may be formed, as in the case of conventional connection elements. For example, the bores of a coupling may form any desired angle and may accommodate tubes of equal or of different sizes. Alternatively, connection element 10 may form part of a chamber housing, with the inner end of its bore 14 communicating with the interior of the chamber.

The outer surface of sleeve portion 12 is provided with a circumferential channel, indicated generally at 20. Channel 20 is preferably of general V-section, with the legs of the V-forming an angle that is typically somewhat less than 90°. The axis of the V is typically inclined with respect to the axis 15 of bore 14. In the present preferred embodiment, one wall 21 of channel 20 lies approximately in a radial plane, while the other wall 22 has the form of a truncated cone with a conical angle 24 of approximately 20°. The bottom 26 of channel 20, which forms the apex of the V, is preferably somewhat rounded. The depth of channel 20 is such that the remaining thickness of material, indicated at 25, between the channel bottom and the wall of bore 14 is relatively small compared to the wall thickness of sleeve 12 on both sides of the channel.

Means of any convenient type are provided for axially compressing sleeve 12. Illustrative compression mechanism comprises the annular nut 30, internally threaded at 31 and engaging the external threads 28 which are provided on sleeve 12 axially inward of channel 20. The nut carries an internal flange 32. The inner axially facing surface 33 of the flange directly opposes the outer axially facing surface 29 of sleeve 12, although those two faces are not necessarily exactly parallel. As seen in axial section, they preferably form a small acute angle, typically about 5°, directed radially inwardly. In released position of nut 30, as in FIG. 1, the faces 29 and 33 touch only at the outer periphery of face 29. When nut 30 is tightened, as illustrated in FIG. 2, flange 32 forcibly engages the sleeve, deflecting face 29 into parallelism with flange face 33 and axially compressing the sleeve.

I have found that when sleeve 12 has the described form and is composed of suitable yieldable material, axial compression of the sleeve produces an internal circumferential ridge or flange 34 on the cylindrical face of bore 14. Ridge 34 appears substantially opposite the bottom of channel 20. In absence of a tube in bore 14, that ridge or bulge has a generally rounded section, as represented schematically by the dotted line 36 in FIG. 1. When a tube 16 has been inserted in bore 14, the crest of bulge 34 encounters the tube surface, is flattened by it, and forms with it a fluid-tight seal.

The most satisfactory deformable material that I have found for making tube fittings in accordance with the invention is polymerized tetrafluoroethylene, which is sold commercially under the trade name Teflon. This material quite rigid against small unit forces, but is deformable elastically in response to larger forces. It can be machined to such forms as are required for the present purpose. It has the further great advantage of a remarkably low coefficient of friction, which permits a metal nut to be turned with moderate torque even when exerting large axial force. For example, with threads of about 20 pitch adequate compressive force can be obtained for operating fittings of the present type by turning the nut with the fingers or with a small wrench.

Other materials having essentially the physical properties of Teflon may be used. Such materials include, for example, polymerized trifluoromonochloroethylene, which is available commercially under the trade name Kel–F; and nylon of suitably selected type. All of these materials have the further advantage of being substantially inert chemically. That property, which is especially marked in the fluorine compounds, permits use of the connectors of the invention for handling many highly corrosive fluids. Materials of the type described have sufficient elastic recovery to permit disassembly and re-use of the connecting elements. As an example of that property, a Teflon connector of the form illustrated was assembled alternately on glass tubes of 12 mm. and 10 mm. diameter, showing no leakage even after 50 such operations.

I have found that when one wall of channel 20 lies substantially in a radial plane, as is true of wall 21 in the present preferred embodiment, the conical angle of the other wall may have a value between about 10° and about 30°. The preferred value of the angle included between the two walls of the channel is thus between about 60 and about 80 degrees. Those characteristics relate most importantly to the portions of channel walls 21 and 22 near the vertex of the channel. It is convenient to make the walls substantially straight, as seen in axial section, but they may depart appreciably from that form, especially near the mouth of the channel.

The depth of channel 20 is selected with relation to the sleeve wall thickness in such a way that the distance 25 between the channel vertex and bore 14 has a value of from about 0.01 to about 0.02 inch. Highly satisfactory operation is obtained with the same value for that distance, for example 0.015 inch, for a wide range of connector diameters.

Channel 20 is preferably spaced inwardly from sleeve end face 29, leaving at least a narrow cylindrical surface at 38. When such a surface is provided, a complementary surface 39 is preferably provided in the interior of the nut. When the nut is tightened, surface 39 then supports the extreme end portion of sleeve 12 against outward radial deformation, concentrating the compressive force at the base of channel 20.

The preferred structure of the present embodiment provides a relatively large working surface on the sleeve to receive the thrust of the compression mechanism, at least as compression nears completion. That working surface typically comprises the entire end face 29 of the sleeve, which is appreciably larger than the cross-sectional area of the sleeve at the bottom of channel 20. Hence the unit force exerted on working face 29 is relatively low, reducing damage from abrasion and the like to a minimum.

In its present preferred form the invention provides further protective action in the following way. Normal tightening of the connection element brings the walls of channel 20 closer together, progressively sharpening the angle at the channel bottom. That condition is represented generally in FIG. 2, though the actual form of the channel may vary considerably from the specific form illustrated. Continued tightening of nut 30 typically produces actual contact of the lower portions of channel walls 21 and 22. That has the advantage of automatically distributing the compressive force over a progressively larger sectional area, strengthening the sleeve structure against excessive compressive that may be applied for any reason.

An important advantage of the invention is the relatively wide range of tube sizes that can be accommodated by a fitting of given dimensions. A range of more than 2 mm. in tube diameter can readily be accepted by the same fitting. Thus, for example, a fitting that receives glass tubing of 12 mm. outside diameter with a nominal clearance of 0.6 mm. can also be reliably connected to 10 mm. tubing. That wide range of size tolerance greatly reduces the variety of fittings needed for such purposes as assembling chemical glassware, for example.

It may be noted that the radial wall thickness of sleeve formation 12 on both sides of channel 20 is sufficient to withstand the axial force of nut 30 without substantial distortion of the sleeve material. Within the axial zone of channel 20, however, the wall thickness decreases to a value insufficient to support that force, and the material is therefore deformed, as at 34. The nature of that deformation may be considered to be determined by the form of the sleeve closely adjacent the point of minimum wall thickness. As seen in axial section in FIG. 1, the material axially inside and outside of point 26 may be characterized by respective thrust axes indicated at 41 and 42. Those axes represent the direction in which thrust may be transmitted by compression of the material with little or no shear. Those thrust axes are preferably substantially straight lines that meet at an obtuse angle substantially at the position of minimum wall thickness. Moreover, that angle is directed radially inward, tending to cause inward deformation of the wall just at its point of minimum shear strength. The small acute angle between working faces 29 and 33, already described, tends to direct thrust axis 42 more positively inward as the compression is applied. The specific conformation illustrated has been found to be especially effective in producing a well defined sealing flange.

I claim:

1. A re-usable tube fitting releasably connectible in fluid-tight relation to a tube end of glass or the like, comprising in combination a unitary, generally cylindrical, partially threaded body of solid resiliently deformable material having substantially the physical properties of solid polymerized tetrafluoroethylene, said body having an axial bore that extends inwardly from one end and is adapted to receive the tube end with substantially uniform clearance, said body terminating in an axially outer annular end face and having an external circumferential channel spaced axially inward of the end face, the cross sectional configuration of the channel being of general V-form, the apex thereof being closely spaced from the wall of the bore and forming a relatively thin resiliently flexible connecting web of said material between axially inner and outer thicker portions of the body, the axially inner wall of the channel forming an essentially annular outer relatively rigid face of said inner body portion, and the axially outer wall of the V being of outwardly extending conical form and terminating in a cylindrical surface, a nut threaded on the body axially inward of the channel and having a radially inwardly facing cylindrical surface that fittingly receives the cylindrical surface of the body intermediate the channel and the end face, and the nut having a radially inwardly extending flange that abuts substantially the entire end face of the body, nut rotation acting to positively drive the end portion of the body axially inward substantially without tipping the outer portion relatively to the body axis, locally resiliently displacing material radially inward adjacent the vertex of the channel to form a bulge that sealingly engages and conforms to the outer surface of the inserted tube and frictionally retains said tube in said bore without deformation of said tube, and said bulge being substantially completely retracted upon reverse rotation of the nut, whereby the fitting is repeatedly re-usable without modification.

2. A tube fitting as defined in claim 1 and wherein the conical axially outer wall of the channel has a conical angle between about 10° and about 30° and the thickness of said connecting web is between about 0.01 and 0.02 inch.

References Cited in the file of this patent

UNITED STATES PATENTS

| | | |
|---|---|---|
| 1,307,540 | Dohner | June 24, 1919 |
| 2,015,541 | Weatherhead | Sept. 24, 1935 |
| 2,381,554 | Norgren | Aug. 7, 1945 |
| 2,693,375 | Wurzburger | Nov. 2, 1954 |
| 3,011,807 | Cowdrey | Dec. 5, 1961 |

FOREIGN PATENTS

| | | |
|---|---|---|
| 86,771 | Sweden | July 7, 1936 |
| 652,054 | Great Britain | Apr. 18, 1951 |